April 27, 1954 G. W. VON HOFE 2,676,726

METHOD OF APPLYING LABELS TO ARTICLES

Original Filed Dec. 21, 1950

INVENTOR.
GEORGE W. VON HOFE
BY Klein + Hart
ATTORNEYS

Patented Apr. 27, 1954

2,676,726

UNITED STATES PATENT OFFICE 2,676,726

METHOD OF APPLYING LABELS TO ARTICLES

George W. von Hofe, Bound Brook, N. J., assignor to New Jersey Machine Corporation, Hoboken, N. J., a corporation of New Jersey Original application December 21, 1950, Serial No. 202,001. Divided and this application March 31, 1953, Serial No. 345,883

5 Claims. (Cl. 216—62)

This application is a division of my copending application, Serial No. 202,001, filed December 21, 1950, now Patent Number 2,651,429, issued September 8, 1953.

This invention relates to methods of applying labels to articles and has for its primary object the provision of an improved method for applying a label of interrupted area with precision on an article surface. The method of the invention is especially useful for the application of annularly-shaped labels to phonograph records and the like.

Another object of the invention is to provide an improved method of applying a heated thermoactivatable adhesive label on a phonograph record made of thermoplastic material without excessive heating of the latter.

Another object of the invention is to provide an improved method which will enable the application of an annular label in precise registry with the locating hole in the center of a phonograph disc so that there will be no portion of the label overlapping such hole to interfere with the operation of automatic record changers.

A further object of the invention is to provide an improved method of precisely registering an annular label on a phonograph disc or other article by utilizing in such registering operation the hole in the article and the hole in the label.

A still further object of the invention is to provide an improved method by which an annular label is registered on a phonograph disc in proper relation to the hole in the latter without the necessity of having on the phonograph disc supporting means, objectionable pin locating means which might damage the disc and interfere with the apparatus feeding the same to such supporting means.

A still further object of the invention is to provide an improved method by which the same device which registers the label on the label carrying means, also registers the label on the phonograph record or other article.

Other objects of the invention, as well as the novel features thereof, will appear from the following description when read in connection with the accompanying drawings, in which.

Figures 1, 2, 3, 4:
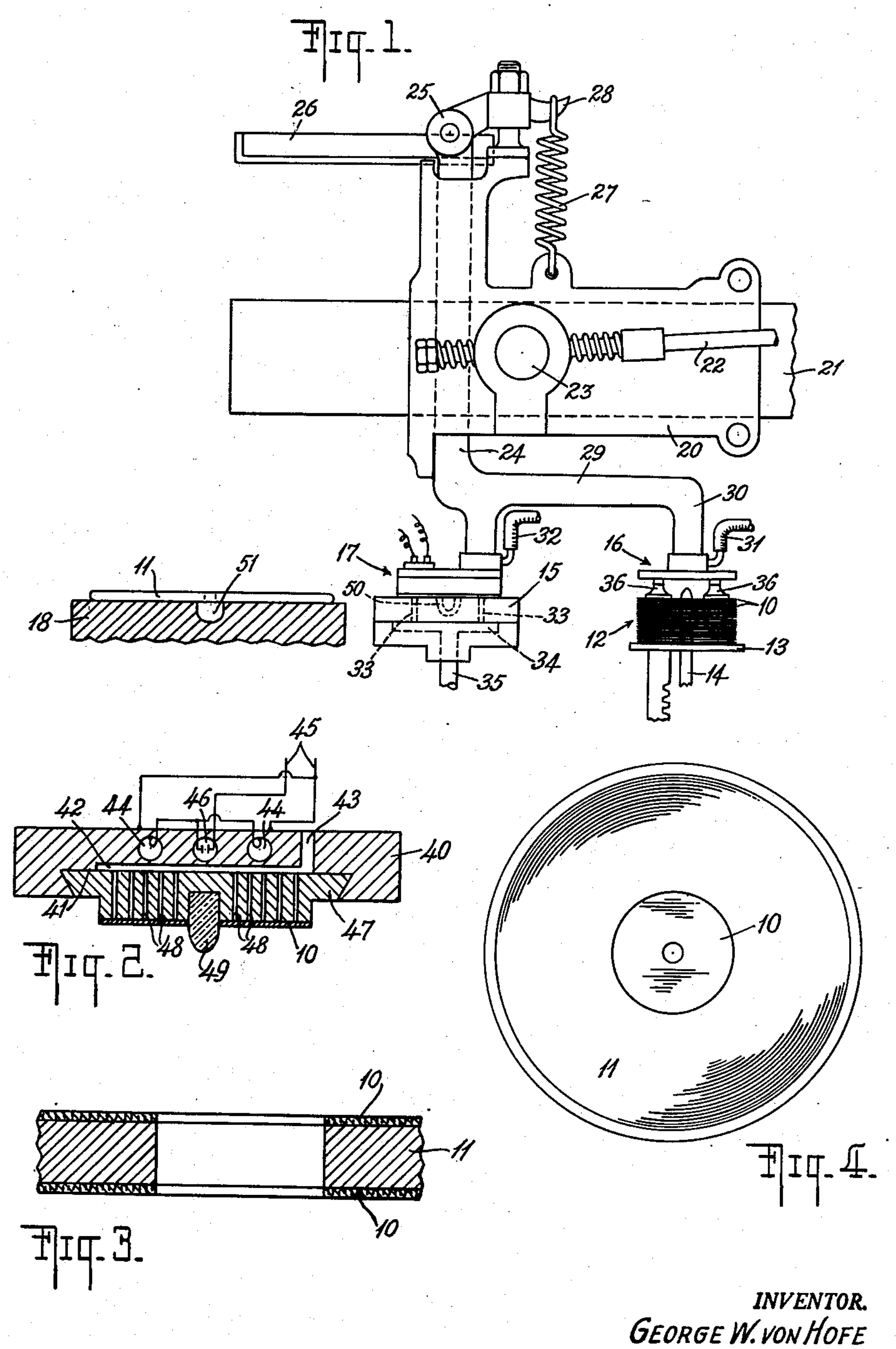
Fig. 1 is a diagrammatic view, partly in section, illustrating one manner in which the invention may be utilized, namely, for the labeling of phonograph discs.
Fig. 2 is a vertical sectional view of a suction transfer head utilized in carrying out the invention.
Fig. 3 is a sectional view of the central portion of a labeled phonograph disc.
Fig. 4 is a plan view of a labeled phonograph disc.

In the drawings, the reference numeral 10 indicates generally the label to be applied to a phonograph disc 11. The label is of annular form having a centrally located hole similar in shape and size to the usual hole in the record 11. On one side of the label 10 is provided a coating of thermoactivatable adhesive material which, when properly heated, will enable the label to adhere to a surface of the record. In the form of the invention disclosed, the labels 10 are formed into an upright stack 12 on a support 13 to which is connected any conventional elevating means for raising the stack 12 of labels at periodic intervals to thereby restore the top label in the stack to a predetermined height, and thus maintain the top labels at a substantially constant feeding level. Extending through the central portion of the support 13 is an adjustable label registering pin 14 which passes upwardly through the holes in the centers of the labels to a point slightly above the uppermost label in the stack when the support 13 is in its lowermost position to receive a stack of predetermined height. It will be understood, that as the support 13 is raised by the elevating means, the pin 14 remains stationary so that the upper end of the pin is always in the same position relative to the topmost label throughout the range of upward movement of the support 13.

In accordance with the invention, the labels 10 are fed from the stack or store thereof on the support 13 which may be stated to be the source of label supply to a support 15 by means of a pick-up device of the suction-operated type which is designated generally in the drawings by the numeral 16. After a label 10 has been deposited upon the support 15, a label carrier or transfer device, designated generally by the numeral 17, transfers the label from such support 15 to the phonograph record 11 mounted on a suitable support, such as for example, the article supporting means designated 18 in Fig. 1 of the drawings. Inasmuch as in this machine, the labels to be applied to the article by the transfer device 17 are obtained from the support 15 to which they are successively fed by the pick-up device 16, such support 15 may be considered as constituting a label supply or transfer station for the labels so transmitted to the articles.

The label applying means in which the above mentioned devices are embodied, may be of any well known type and for the purposes of illustrating the invention, such parts have been shown as embodied in a labeling machine, such as is described and illustrated in the Von Hofe Patent No. 2,227,816, issued January 7, 1941. In such a machine, there is provided a carriage 20 (note Fig. 1), slidably mounted on a horizontal guide rail 21 supported on the frame of the machine. The carriage 20 is reciprocated lengthwise of the rail 21 in predetermined timed sequences by mechanism exemplified in Fig. 1 of the drawings, by the rod 22, which is pivotally connected at 23 to the carriage. A member or plunger 24 is slidably mounted on the carriage 20 and is vertically reciprocated thereon in properly timed relation with the associated parts by mechanism exemplified in Fig. 1 of the drawings by the roller 25 which is adapted to travel along a horizontally-extending track 26 which is arranged to be raised and lowered to reciprocate the member 24. The downward movement of the member 24 may be facilitated by a vertically-disposed spring 27 which is connected at its lower end to the carriage 20 and at its upper end to a lug 28 on the member 24. The spring 27 however, may be omitted in some instances and gravity alone depended upon to accomplish the downward movement of the member 24 when the track 26 is lowered. Secured to the lower end of the member 24 is the label carrier or transfer device 17. Also supported in predetermined spaced relation to the transfer device 17 on the member 24 is the pick-up or label feed device 16. The pick-up device may be mounted in any suitable fashion on the member 24, as by a supporting bracket 29 integrally connected at one end to the member 24 and provided at its other end with a depending portion 30, to the lower end of which is secured the pick-up device 16.

It will be understood from the parts of the label machine thus far described, that when in the operation of the machine, the parts are positioned as shown in Fig. 1, the track 26 is in a lowered position, the pick-up device 16 is in position to pick up a label from the stack or store 12 of labels 10, and the transfer device 17 is in a position to receive a label 10 which has been deposited on the support 15 in the previous operation of the carriage 20. Both the devices 16 and 17 are of the suction type and are connected by tubes 31 and 32, respectively, with a convenient source of suction which is controlled by properly timed valving means of any suitable type so that suction is affected at the label supporting surfaces of such devices while they are positioned as shown in Fig. 1, and until just before the labels carried thereby have been deposited on the support 15 and the article 11, as will hereinafter appear more clear. When a label 10 has been drawn from the stack 12 by the pick-up device 16 and a label has been taken from the support 15 by the transfer device 17, the track 26 is raised to elevate the member 24 and consequently the devices 16 and 17 with the labels thereon. The carriage 20 is then caused to move to the left, as viewed in Fig. 1 of the drawings, to bring the pick-up device 16 over the support 15 and the transfer device 17 over the article 11 which has previously been placed on the support 18 in label receiving position.

The spacing of the stack support 13, support 15 and support 18 is correlated with relation to the spacing of devices 16 and 17 on the member 24 to bring the parts accurately into the positions above described. When the parts are in the said positions, the track 26 is lowered and the member 24 moves downwardly on the carriage 20 to thereby cause the pick-up device 16 to deposit the label carried thereby on the support 15 and to cause the transfer device 17 to deposit its label upon the article 11. Just prior to the depositing of the labels on the support 15 and the article 11, the suction in the devices 16 and 17 is discontinued. Following such depositing of the labels, the devices 16 and 17 are lifted with respect to the carriage 20 by the action of track 26 on the roller 25 and member 24. The labeled article 11 is then removed from or turned upside-down on the support 18, and the carriage 20 is retracted to bring the parts back to the positions shown in Fig. 1 of the drawings to repeat the operations above described.

In carrying out the above described sequence of operations, the valving means controlling the suction in the devices 16 and 17 is so timed that during the retracting movement of such devices and until the label supporting surfaces of device 16 are again in contact with a label on the support 13 and the label supporting surface of the device 17 is poised just above a label on the support 15, the suction on such devices is discontinued. Upon the attaining of such positions of the label supporting surfaces of the devices 16 and 17 however, suction is provided in such devices to hold the labels to the label supporting surfaces thereof, and such suction is maintained during the next advancing movement of such devices and until such devices are just above, but in spaced relation to the support 15 and the article on support 18. The label carrying surface of the support 15 is provided with a plurality of perforations or air vents which communicate by means of passages 33 with a chamber 34 formed within such support. The chamber is connected by means of a tube 35 with a source of air supply. Suitable valve means are provided to control the air supply to the chamber 34 so as to provide a condition of suction in such chamber and consequently at the label carrying surface of the support 15 when a label is delivered to such surface by the label pick-up or feeding device 16 and until such device is to be delivered to the transfer device 17. The valve means is also constructed and arranged to deliver compressed air into the chamber 34 to blow the deposited label 10 into contact with the label carrying surface of the transfer head 17 when the latter is properly positioned in label receiving position with relation to the support 15. Due to the fact that a label on support 15 is deposited thereon so that its thermoplastic coating is in engagement with the label carrying surface of such support and the fact that the label carrying surface of the transfer device 17 is heated, as will hereinafter be explained, the label carrying surface of the transfer device does not contact with the label on the support, but in the pick-up position of such device is slightly spaced therefrom, as has been previously explained, to prevent the label's adherence to the support.

The label carrying surface of the pick-up device 16 is of such form as to enable it to engage with the topmost label in the stack 12 without interfering with the pin 14 extending through such labels. As is shown in Fig. 1 of the drawings, such label carrying surface may be formed by means of a plurality of suction cups 36, so arranged on device 16 as to be spaced from the pin 14 and to engage portions of the topmost label 10 spaced from the central hole thereof. The suction cups 36 are of such depth that the device 16 will not engage with the upper end of the pin 14 when the mouths thereof are engaging the topmost label and are connected by passageways in the body of the device 16 to the tube 31.

As is shown more clearly in Fig. 2 of the drawings, the suction head 17 comprises a main body portion or plate 40 provided at its lower end with a dove-tailed seat which extends centrally between the ends of the plate and transversely of the suction head's path of travel between support or station 15 and the label applying station. Formed in the upper surface 41 of the dove-tailed seat is a recess 42 having predetermined dimensions and shape; the same being determined in part by the surface area of the largest label which the head is designed to carry. The recess 42 is connected by a passageway 43 formed in the upper portion of plate 40 and the plunger 24, to the tube 32. The plate 40 carries a heating device composed of a pair of electrical resistance elements 44, 44, which are connected with a source of electricity by the wires 45, and which are controlled by a thermostat 46 to maintain the plate 40 at a predetermined temperature.

Fitted in the dove-tailed seat of the plate 40 is a dove-tailed metal plate 47 whose lower end of reduced area projects below the bottom surface of the plate 40 and whose upper surface closes the lower open end of the recess 42 to form a suction chamber. Extending through the plate 47 are a multiplicity of transverse, vertically-disposed passageways 48 which are in communication with the suction chamber and which terminate at the lower face of the plate 47. Centrally mounted in plate 47 is a pin 49 which projects downwardly therefrom, a distance greater than the thickness of the phonograph disc 11. Pin 49 is preferably made of a heat insulatable material such as Bakelite or compressed asbestos, so that it does not absorb a substantial portion of the heat in plates 47 and maintains a temperature substantially conforming to that of room temperature. It will be understood however, that pin 49 may be made of any other material and may not be solid but provided with one or more passageways therethrough, and through plate 47 to the suction chamber 42, so that air at room temperature passes through such pin while suction is applied at chamber 42 to maintain such pin at a temperature substantially less than that of plate 47. The downwardly projecting end of pin 49 for a portion of its length preferably has a cross-sectional area substantially the same as the area of the holes on the labels 10 and the phonograph discs 11. The remaining outer portion of pin 49 is of tapered configuration terminating in a rounded outer end as can be seen more clearly in Fig. 2 of the drawings. Provided in supports 15 and 18 are recesses 50 and 51, respectively, having a depth greater than the length of the projecting portion of pin 49 and a cross-sectional area substantially greater than the cross-sectional area of such portion of pin 49 and adapted to receive such pin when the suction device 17 is lowered to such supports in the operations of the machine.

It is believed that an understanding of the operation of the invention will be obtained from the above description, but it may be advisable to point out that when a label 10 is deposited on the label supporting surface of support 15, the suction effective at such surface will cause the label to adhere thereto. When the transfer device 17 is lowered to the point where the pin 49 thereof has partially entered the hole in the label, suction at the surface of support 15 will be discontinued. Thus, as the transfer device continues its downward movement with the pin 49 passing through the hole in the label, the label will be shifted by the tapered sides of pin 49 to properly register it with the label carrying surface of such device, if the label is not already in that condition. The pin 49 passes through the label and into recess 50 of support 15 until the label carrying surface of device 17 is poised just above and in spaced relation to the exterior face of the label. Compressed air will thereupon be passed through tube 35, chamber 34 and the air passage 33 to blow the label into contact with the spaced lower surface of plate 47 of device 17 where it will be held by the suction effective at such surface at that time. The transfer device 17 with the label thereon will then be lifted from the support 15, shifted by the carriage 20 over the record disc 11 on support 18 and then lowered to deposit the label upon the record disc. During the travel of the transfer device 17 from support 15 to the record 11, the label 10 carried thereby is heated by the heating means 44 in plate 40 thereof to adhesively activate the thermoplastic coating on such label. Consequently, when the transfer device 17 is lowered at the applying station to bring the label 10 with its heat activated thermoplastic coating into engagement with the upper surface of the phonograph disc 11, the label will be caused to adhere to such surface of the disc. In the descent of device 17 at such label applying station and when its downward movement has reached the point where the pin 49 has just engaged the hole in the record 10, the suction in said device is discontinued. As the device 17 continues its downward movement, if the disc and label are not in proper registry, the tapered sides of the pin 49 on such device will shift the record 11 to bring them into proper registry. The operation is facilitated by the rigidity of the edge which defines the hole in the record disc 11. As the device 17 ends its downward movement with the pin passed through the record 11 and projecting into the recess 57 of support 18, the upper projecting portion of such pin, which is of an area to snugly fit the holes in the label and record disc, will bring the edges of such holes into precise registration with no overlapping of the label on the hole of record 11. The lower face of plate 47 on the device 17 will then press the label into adhesive connection with the upper surface of the record disc 11. During this pressing operation any air between the label and the record disc will be squeezed out at both the inner and outer peripheries of the label so that the label will become uniformly adhered to the record disc throughout its entire area. The transfer device 17 is then returned to support 15 in the manner previously described to transfer another label from such support to the opposite side of the record or to a new record 11.

While I have hereinabove described and illustrated in the accompanying drawings a preferred method of carrying out my invention, it will be obvious to those skilled in the art that various changes and modifications in such method may be made without departing from the spirit of the invention or the scope of the appended claims. Thus, while it is believed that the aperture 51 of support 18 is sufficient to serve not only to receive the pin 49 as a label is applied to a record, but also as a guide for placing records on such support, additional guide means may be provided on support 18 to position a record in approximately accurate position on such support without interferring with any shifting action of such record caused by pin 49 as the transfer device 17 is lowered to apply a label thereto. It will also be apparent to those skilled in the art that the method may be successfully employed for the application of other types of labels than those coated with thermoactivatable adhesive material. It will also be obvious to those skilled in the art that the method may be satisfactorily carried out utilizing other apparatus than the apparatus herein particularly described and may be carried out by hand utilizing a registering pin or pressing member, such as a flat iron with a registering pin provided on it.

I claim:

1. The method of applying flexible, fragile apertured labels to articles having in a rigid surface thereof an aperture similar in shape and size to the aperture of such labels, comprising placing the article in shiftable condition on a support, inserting a registering pin through the aperture of a label at a place spaced from the article to bring the label into exact registry with a heated surface, holding the label in registered condition against such heated surface to heat the label, then while holding the label in registered engagement with such heated surface inserting the registering pin into the aperture in the surface of the shiftably supported article to which the label is to be applied to bring such surface of the shiftable article into registry with the label so that the edges of the apertures thereof are precisely registered, and pressing the label into contact with the article with the heated surface while maintaining the registry of the label and the article, said insertion of the pin into the article aperture, registering the label and the article and pressing the label on the article, all being accomplished in continuous and progressive fashion and with such pressure as to securely adhere the label to the surface of the article.

2. The method of applying flexible, fragile apertured labels to articles having in a rigid surface thereof an aperture similar in shape and size to the aperture of such labels, comprising placing the article in shiftable condition on a support, inserting a registering pin through the aperture of a label at a place spaced from the article to bring the label into exact registry with a pressing surface, rendering adhesive the article engaging surface of the label while the label is in registry with the pressing surface, then while holding the label in registered engagement with such surface inserting the registering pin into the aperture in the surface of the shiftably supported article to which the label is to be applied to bring such surface of the shiftable article into registry with the label so that the edges of the apertures thereof are precisely registered, and pressing the label into contact with the article while maintaining the registry of the label and the article, said insertion of the pin into the article aperture, registering the label and the article and pressing the label on the article, all being accomplished in continuous and progressive fashion and with such pressure as to securely adhere the label to the surface of the article.

3. The method of applying flexible, fragile labels to articles having registering means provided on a rigid surface thereof outside the area of such surface to which a label is to be adhered, comprising placing the article in shiftable condition on a support, taking a label which is exactly registered in fixed position on a surface of a label carrier, and rendering adhesive the article engaging surface of the label, and then while holding the label in such fixed registered engagement with such carrier surface moving the label relative to the shiftable object to cause the registering means on the carrier to interengage the registering means on the surface of the shiftably supported article to bring the area of such article surface to which the label is to be adhered into proper registry with the label, and pressing the label into contact with such article surface area while maintaining the registry of such surface area and the label, said interengagement of the registering means, registering the label and the article and pressing the label on the article, all being accomplished in continuous and progressive fashion and with such pressure as to securely adhere the label to the surface of the article.

4. The method of applying flexible, fragile labels to articles having registering means provided on a rigid surface thereof outside the area of such surface to which a label is to be adhered, comprising placing the article in shiftable condition on a support, taking a label which is exactly registered in fixed position on a surface of a label carrier and while holding the label in such fixed registered engagement with such carrier surface moving the label relative to the shiftable object to cause the registering means on the carrier to interengage the registering means on the surface of the shiftably supported article to bring the area of such article surface to which the label is to be adhered into proper registry with the label, pressing the label into contact with such article surface area while maintaining the registry of such surface area and the label, and heating the registered label on the carrier while maintaining the registering means of the latter at a lower temperature than that to which the label is subjected so that the label is applied to the article surface in heated condition while the article is not directly subjected to such heat through the registering means, said interengagement of the registering means, registering the label and the article and pressing the label on the article, all being accomplished in continuous and progressive fashion and with pressure as to securely adhere the label to the surface of the article and said registering means being disengaged and the carrier separated from the label immediately after such adherence of the label.

5. The method of applying flexible, fragile aperture labels to phonograph discs and the like, comprising placing the disc in shiftable condition on a support, inserting a registering pin through the aperture of a label at a place spaced from such discs to bring the label into exact registry with a flat pressing surface, rendering adhesive the article engaging surface of the label while the label is in registry with the flat pressing surface, then while holding the label in registered engagement with such flat surface inserting the registering pin into the aperture of the disc to bring the surface of the latter to which the label is to be applied into registry with the label with the edges of the apertures thereof precisely registered, and pressing the label into contact with the disc while maintaining the registry of the label and the disc, said insertion of the pin into the disc, registering the label and the disc, and pressing the label on the disc, all being accomplished in continuous and progressive fashion and with such pressure as to securely adhere the label to the surface of the disc.

References Cited in the file of this patent

UNITED STATES PATENTS

| Number | Name | Date |
|---|---|---|
| 2,300,185 | Von Hofe | Oct. 27, 1942 |
| 2,578,329 | Von Hofe | Dec. 11, 1951 |